United States Patent
Kasetty et al.

(10) Patent No.: US 6,567,235 B2
(45) Date of Patent: May 20, 2003

(54) DRIVE HOUSING WITH INTEGRATED ELECTRICAL CONNECTORS

(75) Inventors: Kumaraswamy Kasetty, Northboro, MA (US); Thomas Andrikowich, Whitinsville, MA (US); Patrick Hearn, Acton, MA (US)

(73) Assignee: Maxtor Corporation, Longmont, CO (US)

( * ) Notice: Subject to any disclaimer, the term of this patent is extended or adjusted under 35 U.S.C. 154(b) by 109 days.

(21) Appl. No.: 09/821,817

(22) Filed: Mar. 29, 2001

(65) Prior Publication Data

US 2002/0141107 A1 Oct. 3, 2002

(51) Int. Cl.⁷ ................................. G11B 17/00
(52) U.S. Cl. .................................. 360/97.01
(58) Field of Search ........................ 360/97.01–97.04; 60/253

(56) References Cited

U.S. PATENT DOCUMENTS

| | | | |
|---|---|---|---|
| 4,418,102 A | | 11/1983 | Ferrato |
| 4,695,490 A | | 9/1987 | McClelland et al. |
| 5,337,202 A | * | 8/1994 | Jabbarai et al. .......... 360/97.01 |
| 5,454,157 A | | 10/1995 | Ananth et al. |
| 5,541,787 A | * | 7/1996 | Jabbari et al. ........... 360/97.01 |
| 5,570,573 A | * | 11/1996 | Bonnelie ...................... 60/253 |
| 5,588,086 A | | 12/1996 | Fan |
| 5,747,363 A | | 5/1998 | Wei et al. |
| 5,872,680 A | * | 2/1999 | Patterson et al. ........ 360/97.02 |
| 5,966,267 A | * | 10/1999 | Hooley et al. ........... 360/97.01 |
| 5,970,194 A | | 10/1999 | Dunn et al. |
| 6,093,886 A | | 7/2000 | Bazizi et al. |
| 6,270,375 B1 | * | 8/2001 | Cox et al. ................ 360/97.01 |

\* cited by examiner

*Primary Examiner*—Allen Cao
(74) *Attorney, Agent, or Firm*—Steven G. Roeder; James P. Broder

(57) ABSTRACT

A drive housing (24) including a housing cover wall (56), a housing base wall (53) having at least one wall aperture (32), and one or more housing side walls (54) that secure the housing base wall (53) to the housing cover wall (56). The drive housing (24) also includes at least one connector (28) that carries electrical signals through the drive housing (24). Each connector (28) extends through a corresponding wall aperture (32). The drive housing (24) also includes a sealer (30) that seals each connector (28) to the housing base wall (53). The housing base wall (53) has a wall coefficient of thermal expansion, and the sealer (30) has a sealer coefficient of thermal expansion. Preferably, the wall coefficient of thermal expansion is substantially similar to the sealer coefficient of thermal expansion. As a consequence, leakage of gas through the drive housing (24) of the disk drive (10) is significantly reduced.

35 Claims, 6 Drawing Sheets

DRIVE HOUSING WITH INTEGRATED ELECTRICAL CONNECTORS

FIELD OF THE INVENTION

The present invention relates generally to disk drives for storing data. More specifically, the present invention relates to a drive housing for a disk drive that inhibits leakage of fluid into or out of the housing.

BACKGROUND

Disk drives are widely used in computers and data processing systems for storing information in digital form. These disk drives commonly use one or more rotating magnetic storage disks to store data positioned within a drive housing. Each storage disk typically includes a data storage surface on each side of the storage disk. These storage surfaces are divided into a plurality of narrow, annular, regions of different radii, commonly referred to as "tracks". Typically, an E-block having one or more actuator arms is used to position a data transducer of a transducer assembly proximate each data storage surface of each storage disk. An actuator motor is used to provide a driving force for moving the E-block relative to the storage disks. A connector assembly including a connector housing and a plurality of connector pins is typically used to transfer electrical signals through the drive housing.

The need for increased storage capacity and compact construction of the disk drive has led to the use of disks having increased track density and decreased track pitch, i.e., more tracks per inch. Additionally, the speed at which the storage disks rotate is rapidly increasing. This causes higher turbulence and windage excitation of the actuator arms and the transducer assemblies. As the tracks per inch and disk speed increase, the ability to maintain the data transducer on a target track becomes more difficult. More specifically, with advances in track density and disk speed, it is particularly necessary to reduce positioning error of the data transducer (also known as "track misregistration") proportionally. With these systems, the accurate and stable positioning of the data transducer proximate the appropriate track is critical to the accurate transfer and/or retrieval of information from the rotating storage disks.

An attempt to compensate for the increase in turbulence and windage includes filling the drive housing with gases such as helium or hydrogen. In this design, the drive housing is hermetically sealed in order to maintain the desired gas within the drive housing. Although the premise of hermetically sealing a disk drive in order to reduce track misregistration is sound, maintaining a sufficient seal has historically been problematic. Over time, the gas (such as helium or hydrogen) escapes from within the drive housing, resulting in a decrease in pressure and potential displacement of the desired gas with air, which ultimately can cause track misregistration due to the turbulence and windage.

Preferably, the desired gas is contained within the drive housing so that less than five percent (5%) leaks out over a five-year period. This translates into a leak rate of less than $4.8 \times 10^{-8}$ cubic centimeters per second (0.000000048 cc/sec). To accomplish this extremely low leakage level, drive manufacturers face three major challenges. First, the drive housing must be hermetically sealed. Second, the electrical signals must be carried in and out of the disk drive without compromising the seal. Third, the technology to meet the first two challenges must be economically and commercially feasible.

With conventional drive housings, leakages can occur at various locations in the drive housing. For example, conventional drive housings typically include a metal housing base having a base aperture that receives the connector housing of the connector assembly. Further, the connector housing is sealed to the housing base and the individual connector pins are sealed to the connector housing with an insulator or sealing material. Unfortunately, with this design, leakages can occur at the junction between the connector housing and the drive housing, or between the connector pins and the connector housing. Further, the seals can weaken or fail resulting in escaping of the gases from the drive housing.

In light of the above, the need exists to provide a disk drive with a decreased incidence of track misregistration. Additionally, the need exists for a hermetically sealed drive housing that inhibits leakage of a desired fluid maintained within the drive housing for an extended period of time. A further need exists to provide a manner of carrying electrical signals in and out of the drive housing without compromising the hermetic seal of the drive housing. Still another need exists to provide a disk drive that is relatively easy and inexpensive to manufacture.

SUMMARY

The present invention is directed to a drive housing for a disk drive which satisfies these needs, and a method for inhibiting leakage of a fluid into or out of a housing chamber of the disk drive. The drive housing typically includes a housing cover wall, a housing base wall, and four side walls that secure the housing base wall to the housing cover wall. As provided herein, one of the housing walls includes a wall aperture. Further, the drive housing also includes at least one connector that carries electrical signals through the drive housing. Each of the connectors can be a connector pin, or alternatively, an edge card connector.

Uniquely, each connector extends through a corresponding wall aperture. For each connector, the drive housing also includes a sealer that seals the connector to the housing wall to inhibit the flow of gas through the housing base. With this design, the connectors are positioned and integrated directly into the drive housing and the need for an additional seal between the drive housing and a connector housing is eliminated. As a consequence, leakage of fluid through the drive housing of the disk drive is significantly reduced.

Preferably, the housing wall has a wall coefficient of thermal expansion, and the sealer has a sealer coefficient of thermal expansion. Importantly, the wall coefficient of thermal expansion is substantially similar to the sealer coefficient of thermal expansion. As a consequence, the potential for leakage is further inhibited.

Additionally, the present invention includes a method for providing a controlled environment for a disk drive. The method includes the steps of providing a drive housing that includes a housing wall having at least one wall aperture, positioning a connector so that the connector extends through the wall aperture, and sealing the connector directly to the housing wall.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
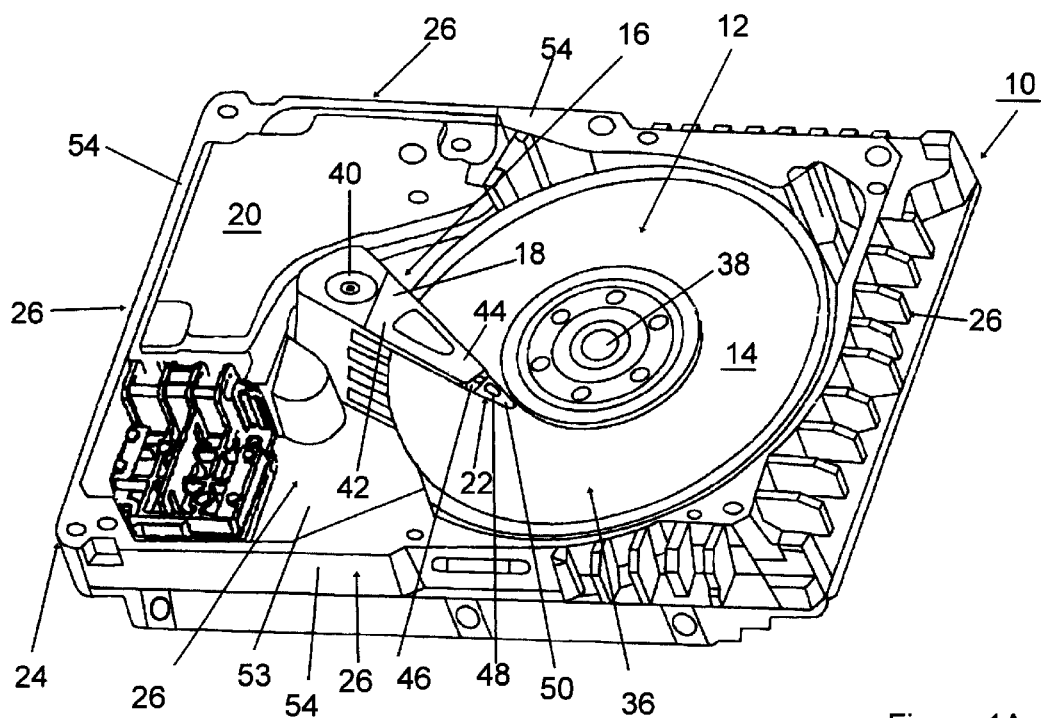
FIG. 1A is an illustrative perspective view of a disk drive having features of the present invention.

Referring initially to FIG. 1, a disk drive 10 according to the present invention includes (i) a disk assembly 12 including one or more storage disks 14, (ii) an E-block 16 having one or more actuator arms 18, (iii) an actuator motor 20, (iv) one or more transducer assemblies 22, and (v) a drive housing 24. As provided below, the drive housing 24 includes one or more housing walls 26, one or more connectors 28 and one or more sealers 30. The housing wall 26 includes one or more wall apertures 32, each having an aperture wall 34. Each connector 28 extends through and is positioned within one corresponding wall aperture 32. Uniquely, each connector 28 is directly sealed to the housing wall 26 with one of the sealers 30. With this design, the connectors 28 are integrated directly into the drive housing 24 and the need for a separate connector housing (not shown) that typically requires an additional seal between the connector housing and the drive housing 24 is eliminated. Eliminating this additional unnecessary seal minimizes potential leakage of a fluid into or out of the drive housing 24.

A detailed description of the various components of a disk drive 10 is provided in U.S. Pat. No. 5,208,712, issued to Hatch et al., and assigned to Quantum Corporation, the assignee of the present invention. The contents of U.S. Pat. No. 5,208,712 are incorporated herein by reference. Accordingly, only the structural aspects of the disk drive 10 that are particularly significant to the present invention are provided in detail herein.

The disk assembly 12 includes the storage disks 14 that store data in a form that can be subsequently retrieved if necessary. Magnetic storage disks 14 are commonly used to store data in digital form. Alternately, for example, each storage disk 14 can be optical or magneto-optical. For conservation of space, each storage disk 14 preferably includes a storage surface 36 on each side of the storage disk 14. These storage surfaces 36 are typically divided into a plurality of narrow annular regions (not shown) of different radii, commonly referred to as "tracks." The storage disks 14 are manufactured by ways known to those skilled in the art.

Depending upon the design of the disk drive 10, any number of storage disks 14 can be used with the disk drive 10. For example, the disk drive 10 can include from one (1) to twelve (12) or more storage disks 14. For two-sided storage disks 14, the storage disks 14 are spaced apart a sufficient distance so that at least one (1) transducer assembly 22 can be positioned proximate each of the storage surfaces 36 of adjacent storage disks 14. To conserve space, a centerline (not shown) of consecutive storage disks 14 is typically spaced apart between about two millimeters (2.0 mm) to four millimeters (4.0 mm).

The storage disks 14 are spaced apart on a disk spindle 38 that is mounted to a spindle shaft (not shown), which is secured to the drive housing 24. The disk spindle 38 rotates on a disk axis (not shown) relative to the spindle shaft on a spindle bearing assembly (not shown). Typically, the disk spindle 38 and the storage disks 14 are rotated about the disk axis at a predetermined angular velocity by a spindle motor (not shown).

The rotation rate of the storage disks 14 varies according to the design of the disk drive 10. Presently, disk drives 10 utilize storage disks 14 rotated at an angular velocity of between about 4,500 RPM to 10,000 RPM. It is anticipated that technological advances will allow for disk drives having storage disks 14 which rotate at higher speeds, such as about 15,000 or more RPM.

The E-block 16 retains and positions the transducer assemblies 22 proximate the appropriate track on the storage disk 14. The design of the E-block 16 can vary. As can best be seen with reference to FIG. 1, the E-block 16 includes an actuator hub 40 and a plurality of parallel actuator arms 18 that are attached to and cantilever from the actuator hub 40.

The actuator arms 18 move with the actuator hub 40 and position the transducer assemblies 22 between the storage disks 14, proximate the storage surfaces 36. Each actuator arm 18 includes a proximal section 42 that is secured to the actuator hub 40 and a distal section 44 that cantilevers away from the actuator hub 40. The spacing of the actuator arms 18 varies according to the spacing of the storage disks 14. The distance between consecutive actuator arms 18 is typically between about two millimeters (2.0 mm) to four millimeters (4.0 mm).

The actuator motor 20 moves the E-block 16 and the transducer assemblies relative to the disk assembly 12. The actuator motor 20 can be implemented in a number of alternate ways known by those skilled in the art. For example, the actuator motor 20 can be a rotary voice coil actuator or a linear voice coil actuator. In the embodiment shown in FIG. 1, the actuator motor 20 is a rotary voice coil actuator. In this embodiment, activation of the actuator motor 20 rotates the E-block 16 and precisely moves the transducer assemblies 22 relative to the storage disks 14.

The transducer assemblies 22 transfer or transmit information between the computer (not shown) or disk drive array (not shown) and the storage disks 14. Each transducer assembly 22 typically includes a load beam 46, a baseplate (not shown) securing the load beam 46 to the actuator arm 18, a flexure 48, and a data transducer 50. The load beam 46 attaches the flexure 48 and the data transducer 50 to the E-block 16. Typically, each load beam 46 is flexible in a direction perpendicular to the storage disk 14 and acts as a spring for supporting the data transducer 50.

Each flexure 48 is used to attach one (1) of the data transducers 50 to one (1) of the load beams 46. Typically, each flexure 48 includes a plurality of conductive flexure traces (not shown) that electrically connect the data transducer 50 to drive circuitry (not shown) of the disk drive 10. Each data transducer 50 interacts with one (1) of the storage disks 14 to access or transfer information to the storage disk 14. For a magnetic storage disk 14, the data transducer 50 is commonly referred to as a read/write head.

Referring now to FIGS. 2–7, the drive housing 24 defines a housing chamber 52 (shown generally in FIG. 2) for supporting and protecting the various internal components of the disk drive 10. The design of the drive housing 24 can vary depending upon the requirements of the disk drive 10. The drive housing 24 can be formed from various materials such as metals or various composites. For example, the drive housing 24 can be substantially constructed from aluminum or other suitable materials known to those skilled in the art.

The drive housing 24 can be hermetically sealed in order to provide a stabilized and controlled environment within the housing chamber 52 around the other components of the disk drive 10. In addition, various fluids (not shown) can be contained within the housing chamber 52, which improve the track-following characteristics of the disk drive 10 by reducing turbulence within the drive housing 24. These fluids can include helium, hydrogen, or other suitable low density gases. Alternately, the drive housing 24 could be designed to provide a vacuum around the other components of the disk drive.

Figure 1B:
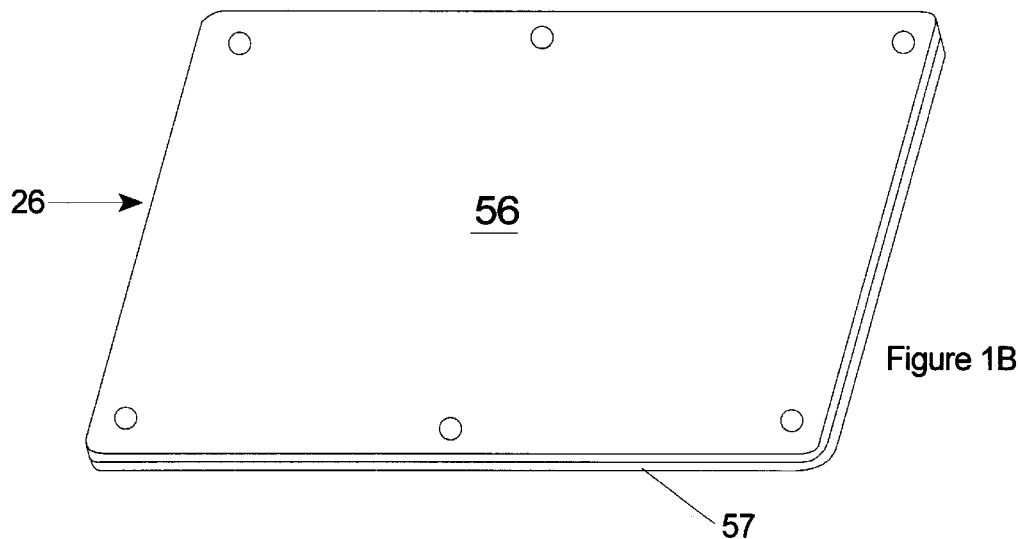
FIG. 1B is a perspective view of a housing cover and cover seal having features of the present invention.
Figure 2:
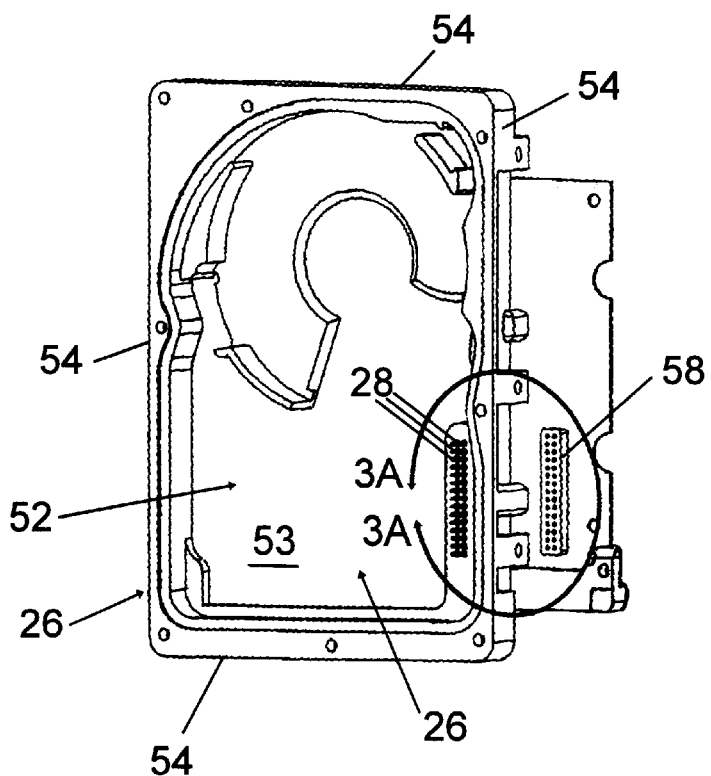
FIG. 2 is a perspective view of a portion of a housing base wall and housing side wall of a drive housing having features of the present invention.

The drive housing 24 provides a stable environment for the components of the disk drive 10 within the housing chamber 52. Specifically, the drive housing 24 inhibits the flow of fluid into or out of the housing chamber 52. Referring to FIGS. 1A, 1B and 2, the drive housing 24 typically includes the housing base wall 53, one or more housing side walls 54 and a housing cover wall 56 (not shown on FIGS. 1A and 2 for clarity). Normally, the drive housing 24 will include four (4) housing side walls 54 that secure the housing base wall 53 to the housing cover wall 56. Further, referring to FIG. 1B, a cover seal 57 is typically used to seal the housing cover wall 56 to the housing side walls 54.

Figure 3A:
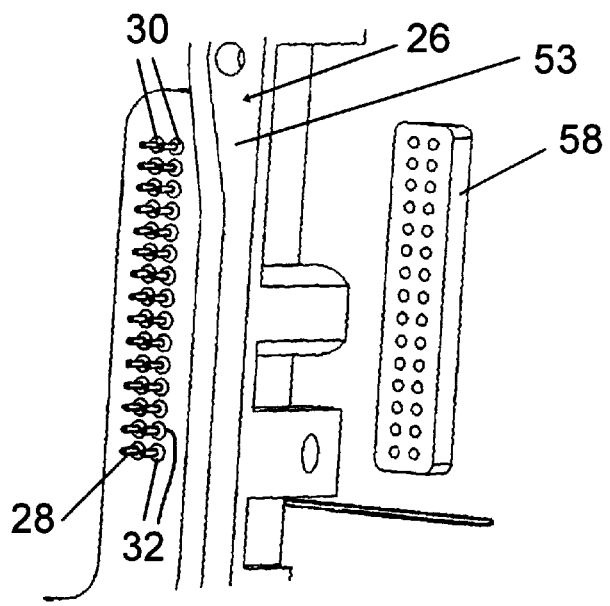
FIG. 3A is an enlarged view taken on line 3A—3A of FIG. 2.
Figure 3B:
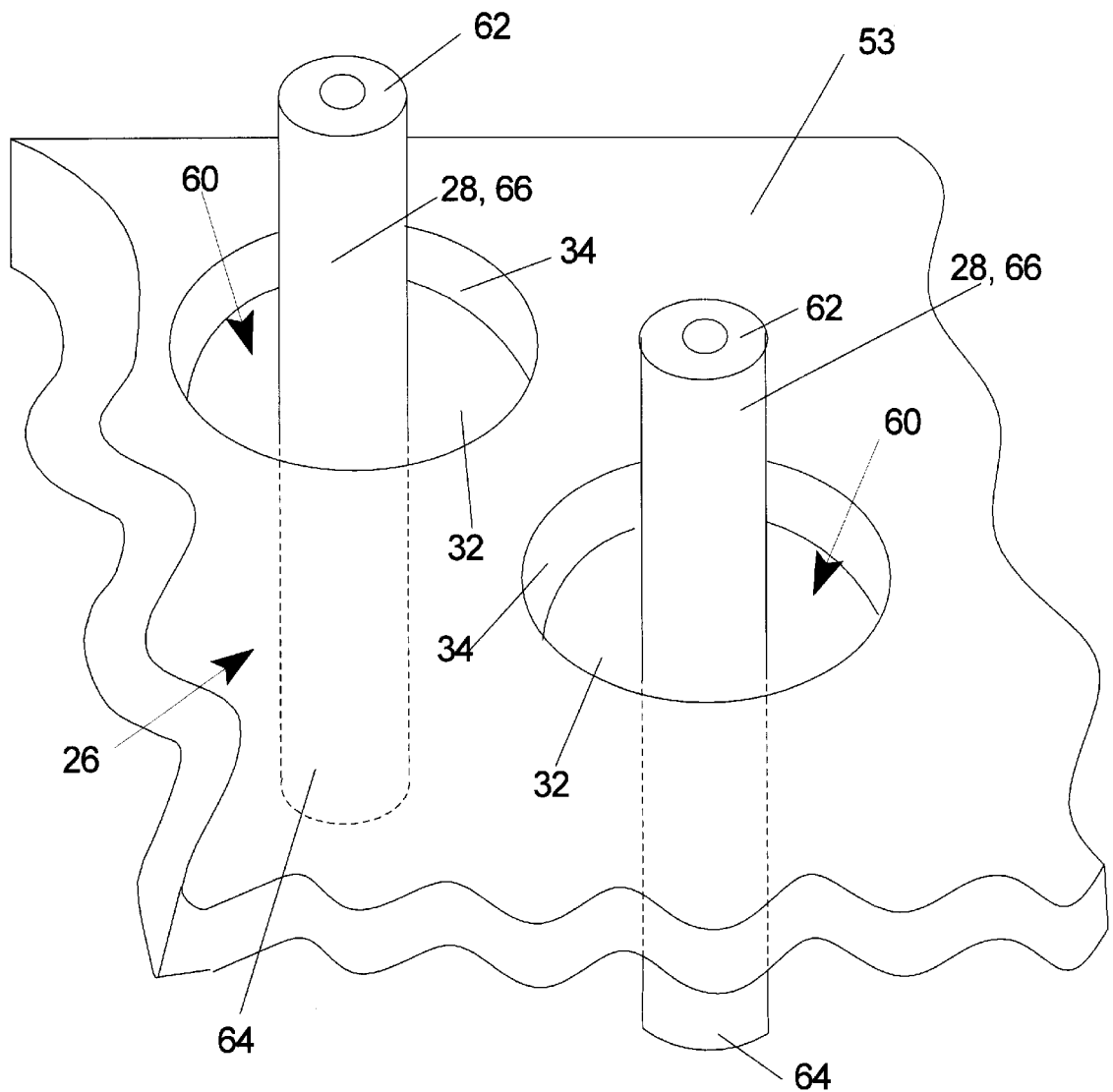
FIG. 3B is an enlarged perspective view of a portion of the drive housing illustrated in FIG. 3A, with sealers removed for clarity.
Figure 6:
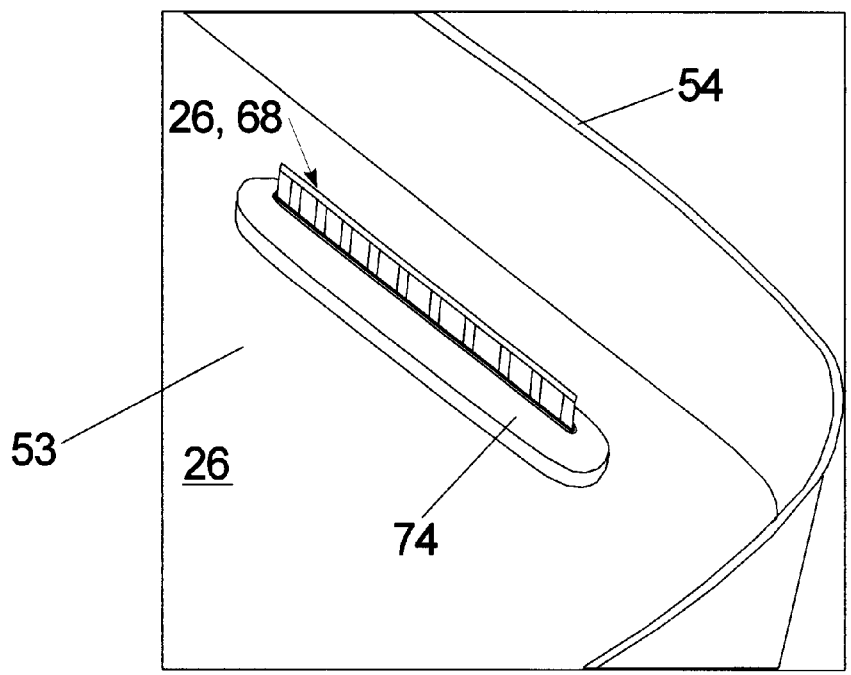
FIG. 6 is a perspective view of a portion of a drive housing including a portion of a housing base having features of the present invention as viewed from the interior of the drive housing.
Figure 7:
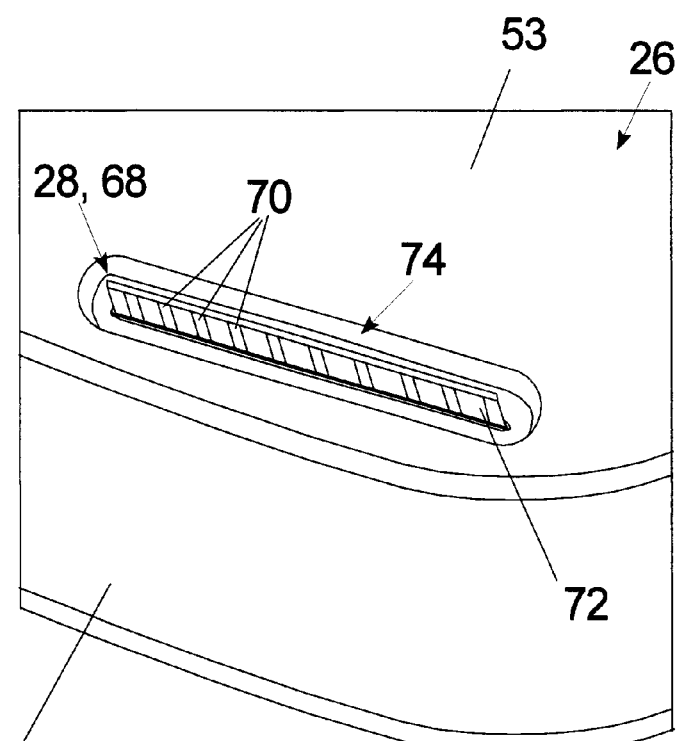
FIG. 7 is perspective view of a portion of the drive housing of FIG. 6 from the exterior of the drive housing.

As provided herein, the one or more connectors 28 can extend through any of the housing walls 26. Referring to FIGS. 2, 3A and 3B, in the embodiments illustrated herein, the one or more connectors 28 extend through the housing base wall 53 and allows electrical communication into and out of the housing chamber 52. The design of the housing base wall 53 can vary depending upon the requirements of the disk drive 10. As provided herein, the housing base wall 53 includes one or more spaced apart wall apertures 32. The size and shape of each wall apertures 32 can also vary depending upon the requirements of the disk drive 10. Each wall aperture 32 is preferably substantially circular in shape. Alternatively, each wall aperture 32 can have a generally rectangular slot shape as illustrated in FIGS. 6 and 7, for example. Moreover, the wall apertures 32 can be formed in the housing wall 26 by a number of methods. For example, the wall apertures 32 can be cast, drilled or machined directly through the housing wall 26, for instance. The aperture wall 34 of each wall aperture 32 provides a bonding surface for the sealers 30, as described in greater detail below.

As previously indicated, the drive housing 24 also includes a connector 28 and a sealer 30 for each of the wall apertures 32. Each connector 28 facilitates an electrical connection between components of the disk drive 10 within the housing chamber 52 and an external connector assembly 58 (illustrated in FIGS. 2 and 3A) on an exterior of the drive housing 24. Each connector 28 is preferably positioned so that the connector 28 extends through a corresponding wall aperture 32, leaving a connector gap 60 around each connector 28, between the connector 28 and the corresponding aperture wall 34 of the each wall aperture 32.

Each connector 28 includes a drive end 62 and a controller end 64. The drive end 62 extends into the housing chamber 52 and is coupled to one or more components within the housing chamber 52. The controller end 64 extends to the exterior of the drive housing 24 and is connected to the external connector assembly 58 which is typically mounted under the housing base wall 53 of the drive housing 24.

Figure 4:
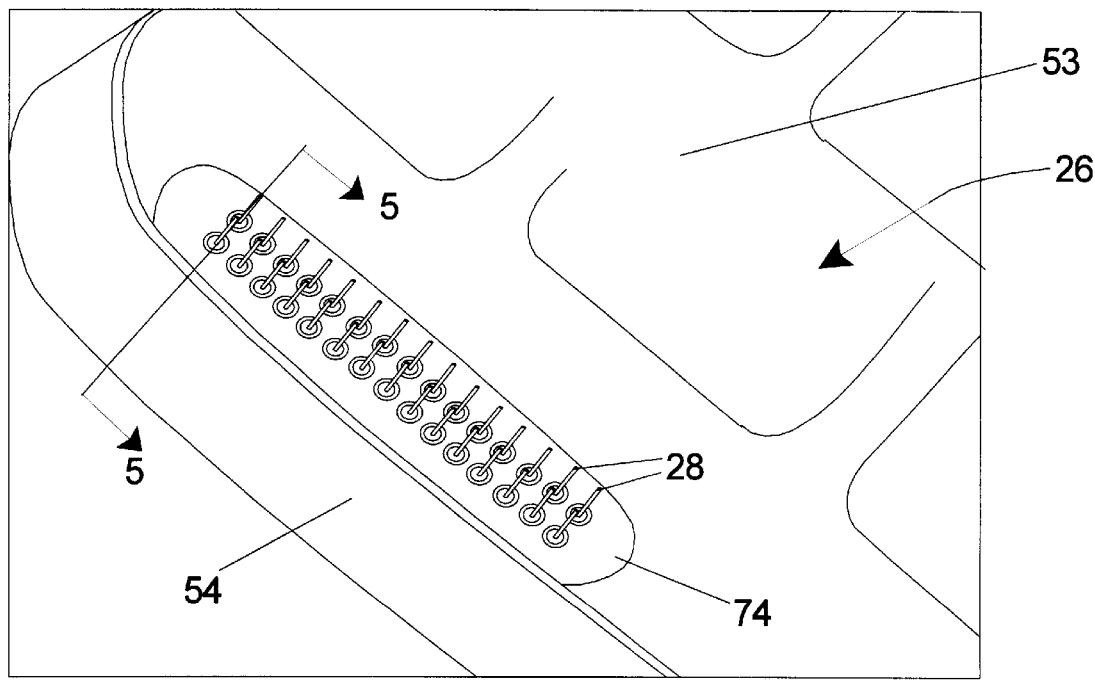
FIG. 4 is a partial cutaway view of a portion of the housing base wall.
Figure 5:
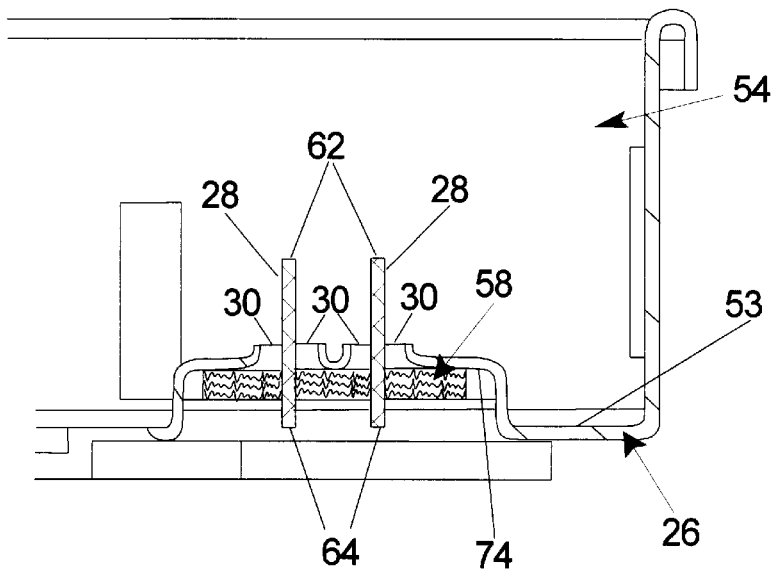
FIG. 5 is a cross-sectional view taken at line 5—5 in FIG. 4.

Referring to FIGS. 2–5, in one embodiment of the present invention each connector 28 is an electrically conductive connector pin 66 that is longer than the thinkness of the housing base wall 53. Each connector pin 66 can be formed from various metals or other electrically conductive materials. Embodiments of the present invention which utilize connector pins 66 as the connectors 28 typically require a plurality of wall apertures 32. As an example, a drive housings 24 with thirty or more wall apertures 32 thirty or more connectors 28 and thirty or more sealers 30 can be used, as illustrated in FIGS. 2–4.

Alternatively, in another embodiment, each connector 28 can be an edge card connector 68, as illustrated in FIGS. 6 and 7. Edge card connectors 68 can vary in size, shape and materials. Generally speaking, an edge card connector 68 is a connector 28 with a plurality of electrical contacts 70 etched on a ceramic substrate 72. This embodiment of the present invention typically requires a single wall aperture 32 that is substantially rectangular or slot-like in shape in order to accommodate the generally long, somewhat narrow edge card connector 68, as illustrated in FIGS. 6 and 7. Alternatively, more than one wall aperture 32 can be used for multiple edge card connectors 68.

The sealers 30 encircle and directly seal each of the connectors 28 to a corresponding aperture wall 34 of each wall aperture 32 and the drive housing 24. The composition of each sealer 30 can vary depending upon the requirements of the disk drive 10. Typically, the sealer 30 is deposited in the connector gap 60 between each connector 28 and the corresponding aperture wall 34. Each connector 28 is normally directly sealed to the aperture wall 34 of one wall aperture 32 with the sealer 30. Preferably, each sealer 30 is injected around the respective connectors 28 under vacuum assist to sufficiently fill the respective connector gap 60. The vacuum assist allows the connector gaps 60 to be filled with the sealer 30 with minimal air pockets. Moreover, the vacuum assist process produces a sealer 30 that is dense, and is therefore less susceptible to permeation of helium or other fluid designed to be used within the housing chamber 52.

Preferably, the sealer 30 is an epoxy material. For example, an epoxy known as Bacon LCA-4 can be used in the present invention, although any suitable epoxy having sufficient bonding quality can be used. More preferably, the sealer 30 has a sealer coefficient of thermal expansion that is substantially similar to a wall coefficient of thermal expansion of the housing wall 26 to minimize leakage during temperature changes. For instance, Bacon LCA-4 has a coefficient of thermal expansion that is very close to that of aluminum, which is typically used in the housing walls 26 of the drive housing 24. However, other epoxy materials with suitable thermal expansion characteristics can be used. As provided herein, the sealer coefficient of thermal expansion is preferably within approximately ten percent of the wall coefficient of thermal expansion and even more preferably within approximately five percent of the wall coefficient of thermal expansion.

In addition, the sealer 30 preferably has a relatively high strain rate. The strain rate is a measure of the flexibility and the ability of the sealer 30 to elongate without compromising the seal that is formed with the sealer 30. A high strain rate allows the sealer 30 to withstand changes in dimensional variations resulting from changing stress levels. As provided herein, the sealer strain rate is preferably at least approximately one percent and even more preferably at least approximately three percent. The preferred properties of the sealer 30 stated herein provide a reliable and long-lasting bond between the connector 28 and the housing wall 26, which resists gaseous leakage over long periods of time.

The housing base 53 of the drive housing 24 can also include a connector recess 74 that defines a general location for the wall apertures 32, the connectors 28 and the sealer 30. Additionally, the connector recess 74 provides a recessed location for positioning of the external connector assembly 58, as illustrated in FIGS. 4–7. The connector recess 74 is generally recessed when viewed from the exterior of the drive housing 24, as shown in FIG. 6, for example. The connector recess 74 is typically formed as an integral portion of the housing base 53 of the drive housing 24.

Figure 8:
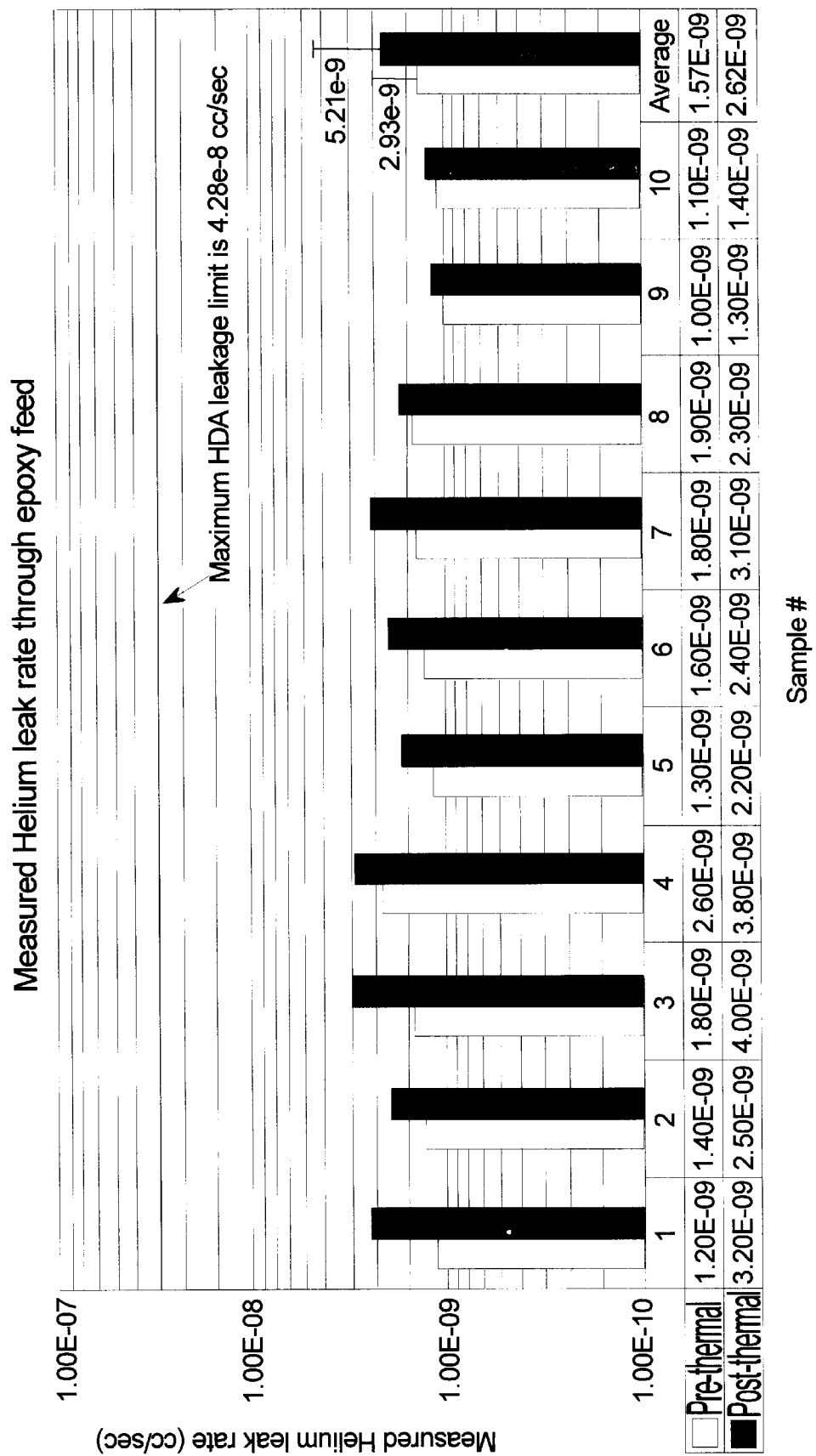
FIG. 8 is a graphical representation of experimental results of a helium leak rate through a housing wall having features of the present invention.

FIG. 8 graphically illustrates experimental data showing extremely low pre-thermal and post-thermal leakage rates for ten (10) test disk drives 10 having features of the present invention. Each of the ten samples includes Bacon LCA-4 epoxy as the sealer 30, and a 0.125 inch thick aluminum housing wall 26 for the drive housing 24. FIG. 8 shows a relatively tight distribution, with an average pre-thermal leak rate of $1.57 \times 10^{-9}$ cc/sec, and an average post-thermal leak rate of $2.62 \times 10^{-9}$ cc/sec, both of which are well below the preferred maximum leakage limit of less than five percent (5%) per five-year period, or $4.8 \times 10^{-8}$ cubic centimeters per second (0.000000048 cc/sec). All ten samples tested were below the preferred maximum leakage limit.

While the particular drive housing 24 and disk drive 10 as herein shown and disclosed in detail are fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A drive housing for a disk drive, the drive housing comprising:
   a housing wall including a wall aperture having an aperture wall;
   a connector that extends through the wall aperture, the connector being adapted to carry electrical signals through the housing wall; and
   a sealer that seals around the connector and directly seals the connector to the aperture wall to inhibit the flow of a fluid through the wall aperture.

2. The drive housing of claim 1 wherein the housing wall is a housing base wall and drive housing further comprises (i) a housing cover wall, and (ii) four side walls that connect the housing cover wall to the housing base wall.

3. The drive housing of claim 1 wherein the sealer includes an epoxy material.

4. The drive housing of claim 1 wherein the housing wall has a wall coefficient of thermal expansion near the wall aperture, and the sealer has a sealer coefficient of thermal expansion, and wherein the wall coefficient of thermal expansion is substantially similar to the sealer coefficient of thermal expansion.

5. The drive housing of claim 1 wherein the connector is an electrically conductive pin.

6. The drive housing of claim 1 including a plurality of spaced apart wall apertures that extend through the housing wall, and a plurality of connectors, wherein each of the connectors extends through a separate wall aperture.

7. The drive housing of claim 6 including a plurality of sealers, wherein each of the sealers extends between and seals a separate one of the connectors to the housing wall.

8. The drive housing of claim 7 wherein each of the sealers includes an epoxy material.

9. The drive housing of claim 6 wherein each of the connectors is an electrically conductive pin.

10. The drive housing of claim 6 wherein each of the connectors is positioned substantially orthogonal to the housing wall.

11. The drive housing of claim 1 comprising (i) at least thirty (30) spaced apart wall apertures that extend through the housing wall, (ii) at least thirty (30) connectors, wherein each of the connectors extends through a separate wall aperture.

12. The drive housing of claim 11 including at least thirty sealers, wherein each of the sealers extends between and seals a separate one of the connectors to the housing wall.

13. The drive housing of claim 1 wherein the connector is an edge card connector.

14. A disk drive including the drive housing of claim 1, and a storage disk positioned within the drive housing.

15. The disk drive of claim 14 wherein the drive housing is substantially hermetically sealed.

16. A drive housing for inhibiting leakage of gas into or out of a housing chamber of a disk drive, the drive housing comprising:
   a housing base including a plurality of base apertures, each of the base apertures having an aperture wall;
   a housing cover;
   a side wall that connects the housing cover to the housing base, the side wall being formed as a unitary structure with the housing base;
   a plurality of connectors that each extends through a corresponding base aperture, each of the connectors being adapted to carry electrical signals through the drive housing; and
   a sealer assembly that is positioned around each of the connectors, the sealer assembly directly sealing each connector to a corresponding aperture wall to inhibit the flow of fluid through the housing base.

17. The drive housing of claim 16 wherein the sealer assembly includes a plurality of sealers that are each positioned around a corresponding connector.

18. The drive housing of claim 16 wherein the plurality of base apertures includes a first base aperture and a second base aperture, the first base aperture having a first aperture wall and the second base aperture having a second aperture wall, wherein the plurality of connectors includes a first connector and a second connector, and wherein the sealer assembly includes a first sealer that seals around the first connector, the first sealer directly sealing the first connector to the first aperture wall, and a second sealer that seals around the second connector, the second sealer directly sealing the second connector to the second aperture wall.

19. The drive housing of claim 16 wherein at last a portion of the sealer assembly has a coefficient of thermal expansion that is substantially similar to a coefficient of thermal expansion of the housing base.

20. The drive housing of claim 16 wherein the entire sealer assembly has a coefficient of thermal expansion that is substantially similar to the coefficient of thermal expansion of the housing base.

21. The drive housing of claim 16 wherein each of the connectors is a connector pin.

22. A disk drive including the drive housing of claim 16 and a storage disk positioned within the housing chamber.

23. A disk drive comprising:

a storage disk, and a drive housing that substantially encircles the storage disk, the drive housing including (i) a housing side wall, (ii) a housing base secured to the housing side wall, the housing base forming a unitary structure with at least a portion of the housing side wall, the housing base including a first base aperture having a first aperture wall and a second base aperture having a second aperture wall, and (iii) a first connector and a second connector that each carry electrical signals trough the drive housing, only the first connector extending through the first base aperture, and only the second connector extending through the second base aperture; and a sealer assembly that seals around each of the connectors, the sealer assembly directly sealing the first connector to the first aperture wall and the second connector to the second aperture wall to inhibit the flow of fluid through the housing base.

24. The disk drive of claim 23 wherein the sealer assembly includes a plurality of sealers that are each positioned around a corresponding connector.

25. The disk drive of claim 23 wherein the sealer assembly includes a first sealer that seals around the first connector and a second sealer that seals around the second connector.

26. The disk drive of claim 23 wherein the sealer assembly has a coefficient of thermal expansion that is substantially similar to a coefficient of thermal expansion of the housing base.

27. The disk drive of claim 23 wherein the sealer assembly includes an epoxy material.

28. The disk drive of claim 23 wherein each of the connectors is a connector pin.

29. The disk drive of claim 23 wherein the drive housing includes (i) at least thirty base aperture, and (ii) at least thirty connectors, wherein each connector extends through a corresponding base aperture.

30. The disk drive of claim 23 wherein on of the connectors is an edge card connector.

31. The disk drive of claim 23 wherein the disk drive is substantially hermetically sealed.

32. A method for inhibiting leakage of gas into or out of a housing chamber of a disk drive, the method comprising the steps of:

forming a housing base and a side wall of a drive housing as a unitary structure;

positioning a base aperture in the housing base, the base aperture having an aperture wall;

position a connector that carries electrical signals so that the connector extends through the base aperture; and sealing around the connector to seal the connector directly to the aperture wall.

33. The method of claim 32 wherein the step of sealing around the connector includes using a sealer having a coefficient of the thermal expansion that is substantially similar to a coefficient of thermal expansion of a portion of the housing base.

34. The method of claim 32 wherein the connector is an edge card connector.

35. The method of claim 32 wherein the connector is a connector pin.

* * * * *

UNITED STATES PATENT AND TRADEMARK OFFICE
CERTIFICATE OF CORRECTION

PATENT NO.    : 6,567,235 B2
DATED         : May 20, 2003
INVENTOR(S)   : Kasetty et al.

It is certified that error appears in the above-identified patent and that said Letters Patent is hereby corrected as shown below:

<u>Column 8,</u>
Line 1, please replace "last" with -- least --.

<u>Column 10,</u>
Line 6, please replace "aperture" with -- apertures --.
Line 9, please replace "on" with -- one --.
Line 21, please replace "position" with -- positioning --.

Signed and Sealed this

Sixteenth Day of September, 2003

JAMES E. ROGAN
*Director of the United States Patent and Trademark Office*